United States Patent [19]

Cooperman et al.

[11] 4,354,266
[45] Oct. 12, 1982

[54] MULTIPLEXOR WITH DECODING

[75] Inventors: Michael Cooperman, Framingham, Mass.; Christopher W. Kapral, San Carlos, Calif.

[73] Assignee: GTE Laboratories Incorporated, Waltham, Mass.

[21] Appl. No.: 90,159

[22] Filed: Oct. 31, 1979

[51] Int. Cl.³ .............................................. H04J 3/02
[52] U.S. Cl. .................................... 370/112; 307/243
[58] Field of Search .................. 370/112, 46; 307/243, 307/244

[56] References Cited
U.S. PATENT DOCUMENTS 3,639,781  2/1972  Marley ............................... 370/112
3,783,307  1/1974  Breuer ................................. 307/243
4,157,589  6/1979  Kapral et al. ........................ 364/716

OTHER PUBLICATIONS

*MECL Integrated Circuits Data Book*, Motorola Semiconductor Products Inc., Sep. 1973, pp. 5-75.

Primary Examiner—Douglas W. Olms
Attorney, Agent, or Firm—David M. Keay

[57] ABSTRACT

Multiplexor with internal decoding. Signal levels at two select input terminals select the data input at one of four data input terminals to be applied to an output terminal. The multiplexor includes three sets of pairs of transistors connected in a series arrangement. In one embodiment the current source for the transistors includes a resistance and diode in parallel connected between ground and the transistors of the third set and a resistance connected between a source of negative potential and the transistors of the first set. In another embodiment the current source includes a dual emitter transistor biased to operate as a constant current source connected between the source of negative potential and the transistors of the first set in place of the resistance.

8 Claims, 3 Drawing Figures

1

MULTIPLEXOR WITH DECODING

BACKGROUND OF THE INVENTION

This invention relates to multiplexors. More particularly, it is concerned with multiplexor circuits having internal decoding.

One function which has proven readily amenable to being incorporated into conventional bipolar transistor integrated circuits is that of multiplexing. In addition, in order to reduce the number of interconnections between individual units of an apparatus the function of decoding the select input information may also be incorporated into the multiplexor integrated circuit. One typical form of a multiplexor with decoding has four data input terminals which are selectively connected to an output terminal by binary signals applied to select input terminals. A circuit of this type employs three sets of transistor pairs arranged in series. Binary select input signals to the pair of transistors of the first two sets steer the current flow through one of four pairs of transistors of the third set to which the data input terminals are connected. It is desirable that multiplexor circuitry of this type operate at rapid switching speeds and have low voltage and consequently low power consumption requirements.

SUMMARY OF THE INVENTION

Multiplexors in accordance with the present invention operate at lower voltage and with lower power consumption than multiplexors heretofore available. Multiplexors in accordance with the present invention employ three sets of transistor elements each having three electrodes. The first set of transistor elements includes a pair of transistor elements with their first electrodes connected together. The second electrode of one of the transistor elements is connected to a first point of fixed potential and the second electrode of the other transistor element is connected to a first select input terminal.

The second set includes two pairs of transistor elements with the first electrodes of the transistor elements of the first pair connected together and to the third electrode of the one transistor element of the first set. The first electrodes of the transistor elements of the second pair are connected together and to the third electrode of the other transistor element of the first set. The second electrodes of one of the transistor elements of each of the two pairs are connected together and to a second point of fixed potential. The second electrodes of the other transistor elements of each of the two pairs are connected together and to a second select input terminal.

The third set includes four pairs of transistor elements. The first electrodes of the transistor elements of each pair are connected to the third electrode of a transistor element of the second set. The second electrodes of one of the transistor elements of each of the four pairs are connected together and to a third point of fixed potential. The second electrodes of each of the other transistor elements of each of the four pairs are individually connected to separate data input terminals. The third electrodes of the one transistor elements of the four pairs are connected together to an output terminal and through a resistance to a first source of reference potential. The third electrodes of the other transistor elements of the four pairs are connected directly to the first source of reference potential.

In one embodiment of the invention a resistance is connected between the first electrodes of the pair of transistor elements of the first set and a second source of reference potential. In another embodiment a transistor device has a first electrode connected directly to a second source of reference potential, a second electrode connected to a fourth point of fixed potential, and a third electrode connected directly to the first electrodes of the pair of transistor elements of the first set.

For a better understanding of the present invention, together with other and further objects, advantages, and capabilities thereof, reference is made to the following discussion and appended claims in connection with the above described drawings.

DETAILED DESCRIPTION OF THE INVENTION

Figure 1:
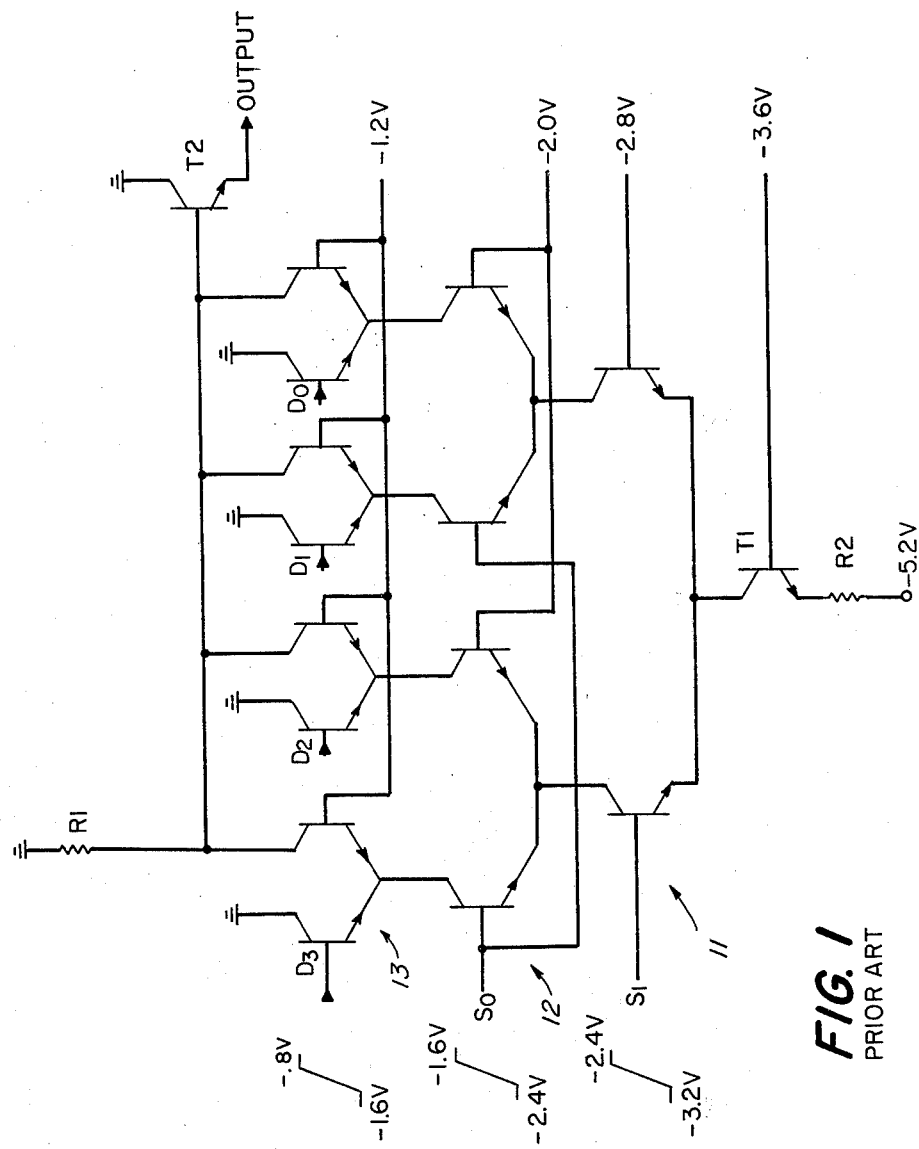
FIG. 1 is a schematic circuit diagram of a multiplexor of the type known in the prior art.

Multiplexors in accordance with the present invention and their method of operation together with improvements therein over those heretofore available may best be understood by first referring to FIG. 1 which is a schematic circuit diagram of a well-known prior art multiplexor integrated circuit. The multiplexor of FIG. 1 employs three sets of NPN bipolar transistors 11, 12, and 13 arranged in pairs with their electrodes and emitters connected in series as shown. The collectors of one transistor of each of the four pairs of the third set 13 are connected directly to ground, and the collectors of the other transistors of the four pairs of the third set 13 are connected through a resistance R1 to ground. These transistors are also connected to the base of an output transistor T2 having an output terminal connected at its emitter. The emitters of the single pair of transistors of the first set 11 are connected to the collector of an NPN transistor T1 which has its emitter connected through a resistance R2 to a source of negative potential, specifically $-5.2$ volts. The arrangement as described provides a constant current source such that regardless of the path of current flow through the three sets of transistors, the amount of current is the same. The value of $-5.2$ volts for the power source prevents the circuit from going into saturation. The bases of one transistor of each pair of the same set are connected in common to points of fixed bias potential as shown, and the base of transistor T1 is also connected to a point of bias potential.

Data input signals are applied at data input terminals $D_0$–$D_3$ and select input signals are applied at select input terminals $S_1$ and $S_0$. The signals at the two select input terminals $S_1$ and $S_0$ determine which of the four data input signals at terminals $D_0$–$D_3$ appear at the output. With a select signal of either level as indicated in FIG. 1 applied to the $S_1$ select input terminal, the transistor of the pair of the first set 11 having the more positive base voltage is biased to conduction thus selecting the pair of transistors of the second set 12 connected to it. Depending upon which signal level is applied at the $S_0$ select input terminal, the transistor of the selected pair of the second set 12 having the more positive base voltage is also biased to conduction thus selecting the pair of transistors of the third set 13 connected to it. The level of the data input signal as indicated in FIG. 1 at the data input terminals $D_0$–$D_3$ of the selected pair of transistors of the third set 13 causes one or the other of the transistors to conduct. Thus, current flows through one of the transistors of each set and through the current source of transistor T1 and resistance R2. Depending upon whether or not the current flows through resistance R1 an output signal of either −1.6 volts or −0.8 volts is produced at the output terminal, the same as the voltage at the data input terminal $D_0$–$D_3$ of the selected pair of transistors of the third set 13. As is well understood by switching the voltage levels at the select input terminals $S_1$ and $S_0$ the data at the data input terminals $D_0$–$D_3$ may be multiplexed to appear at the output in appropriate sequence.

Figure 2:
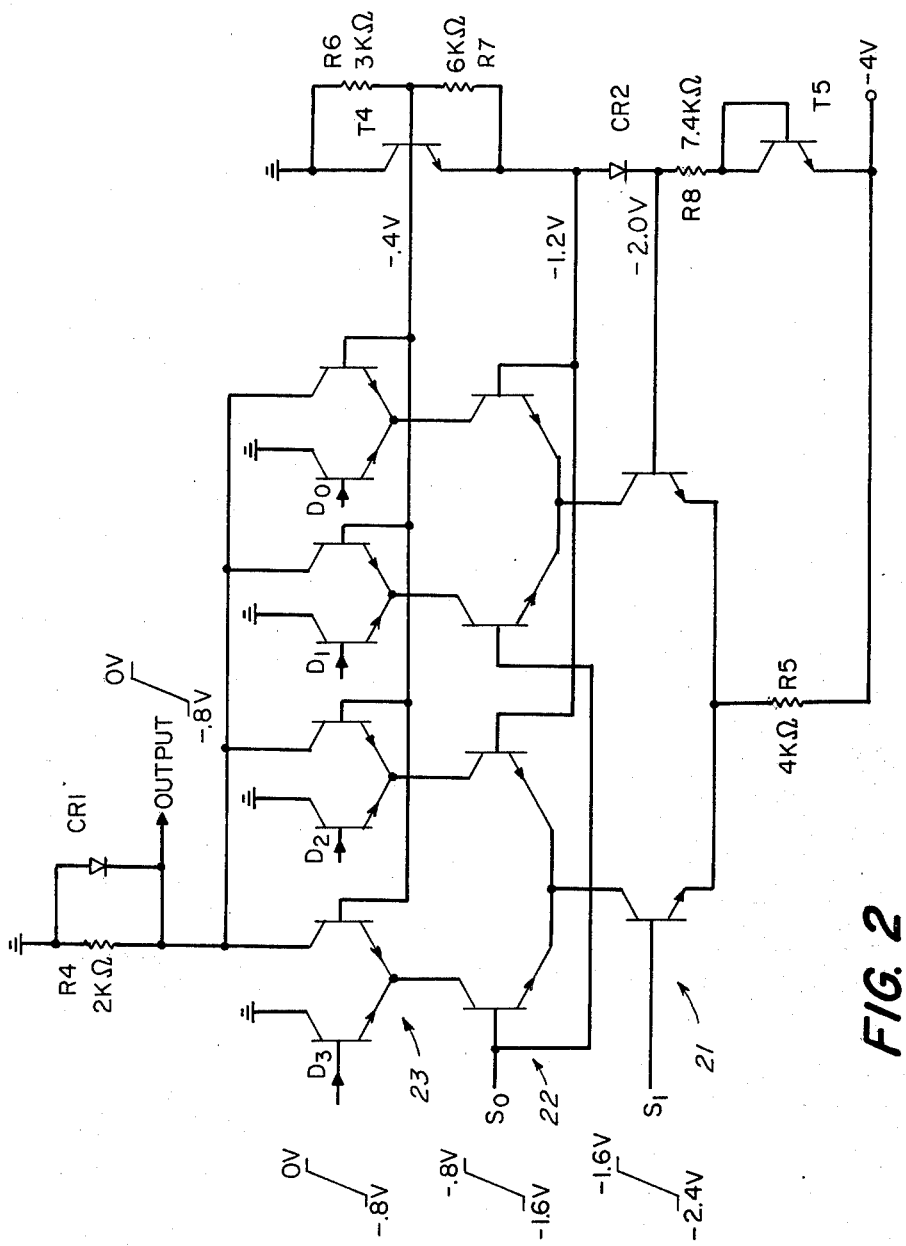
FIG. 2 is a schematic circuit diagram of one embodiment of a multiplexor in accordance with the present invention.

FIG. 2 is a schematic circuit diagram of one specific embodiment of a multiplexor in accordance with the present invention. The circuit is similar to the prior art circuit of FIG. 1 in that it includes three sets of NPN bipolar transistors arranged in pairs and interconnected as shown. Select input terminals $S_1$ and $S_0$ are connected to the first and second sets 21 and 22, respectively, and data input terminals $D_0$–$D_3$ are connected to the third set 23. In the embodiment of FIG. 2 the collectors of one transistor of each of the four pairs of the third set 23 are connected directly to ground. The collectors of the other transistors of each pair of the third set 23 are connected together and through a resistance R4 in parallel with a diode CR1 to ground. These collectors are also connected directly to the output terminal.

The emitters of the pair of transistors of the first set 21 are connected through a resistance R5 to a source of reference potential, specifically −4 volts. A biasing network is connected between the −4 volt power source and ground as shown in FIG. 2. The network includes a transistor T4 having its collector connected to ground, a resistance R6 connected between the collector and base, and a resistance R7 connected between the emitter and base. The emitter is connected to a diode CR2 which is connected in series to a resistance R8. The resistance R8 is connected to the shorted collector and base of a transistor T5. The emitter of transistor T5 is connected to the −4 volt power source. This network provides fixed biasing potentials to the bases of one transistor of each pair of each set as shown in FIG. 2.

Input signals as indicated in FIG. 2 are applied at the select input terminals $S_1$ and $S_0$ and at the data input terminals $D_0$–$D_3$. As is well understood the particular signals applied to the $S_1$ and $S_0$ terminals select the particular data input terminals $D_0$–$D_3$ to be connected to the output terminal.

The circuit of FIG. 2 employs a different current source arrangement than that of the prior art circuit of FIG. 1 and operates with only a −4 volt power supply. Since the current through resistance R5 varies depending upon the selected current path through the three sets of transistors, diode CR1 is required across resistance R4 to prevent the output voltage from becoming more negative than a diode voltage drop. This arrangement prevents saturation of the transistors of the third set 23 which are connected to the output terminal.

Figure 3:
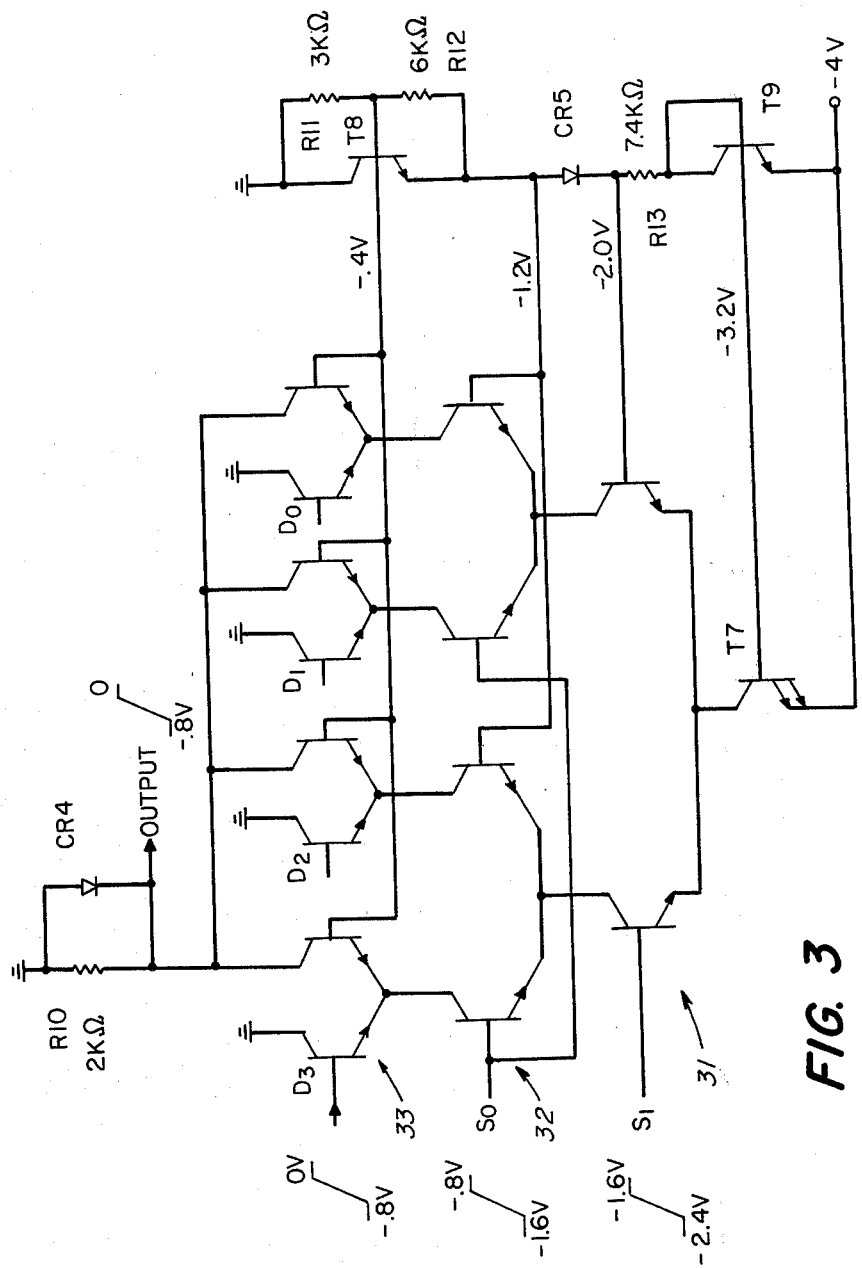
FIG. 3 is a schematic circuit diagram of another embodiment of a multiplexor in accordance with the present invention.

Another embodiment of a multiplexor in accordance with the present invention is illustrated in the schematic circuit diagram of FIG. 3. This embodiment includes an arrangement of three sets 31, 32, and 33 of transistor pairs, select input terminals $S_1$ and $S_0$, and data input terminals $D_0$–$D_3$ as in the embodiment of FIG. 2. A resistance R10 and a diode CR4 are also connected in parallel between the output terminal and ground. In addition, a similar biasing network of transistors T8 and T9, resistances R11, R12, and R13, and diode CR5 is employed.

The multiplexor of FIG. 3 has an NPN bipolar transistor T7 with its collector connected directly to the emitters of the transistor pair of the first set 31 and its base connected directly to the base of transistor T9 of the biasing network. Transistor T7 has two emitters both of which are connected to the −4 volt source. This arrangement provides a constant current source, the magnitude of the current being determined by resistances R11, R12, R13, diode CR5, transistors T9 and T7, and the supply voltage of −4 volts. With the physical geometry of transistors T7 and T9 the same and with their bases and emitters interconnected as shown, the current through transistor T7 is twice the current through T9.

Since the current depends on the above circuit parameters, a diode CR4 is required across the resistance R10 to clamp the output. This arrangement assures that the output is equal to a diode drop thereby preventing the circuit from going into saturation.

While there has been shown and described what are considered preferred embodiments of the present invention, it will be obvious to those skilled in the art that various changes and modifications may be made therein without departing from the invention as defined by the appended claims.

What is claimed is:

1. A multiplexor comprising
three sets of transistor elements, each transistor element having three electrodes;
the first of said sets including a pair of transistor elements having their first electrodes connected together, the second electrode of one of the transistor elements of the pair being connected to a first point of fixed potential, and the second electrode of the other of the transistor elements of the pair being connected to a first select input terminal;
the second of said sets including two pairs of transistor elements, the first electrodes of the transistor elements of the first pair being connected together and to the third electrode of the one transistor element of the first set, the first electrodes of the transistor elements of the second pair being connected together and to the third electrode of the other transistor element of the first set, the second electrodes of one of the transistor elements of each of the two pairs being connected together and to a second point of fixed potential, and the second electrodes of the other of the transistor elements of each of the two pairs being connected together and to a second select input terminal;
the third of said sets including four pairs of transistor elements, the first electrodes of the transistor elements of the first pair being connected together and to the third electrode of the one transistor element of the first pair of the second set, the first electrodes of the transistor elements of the second pair being connected together and to the third electrode of the other transistor element of the first pair of the second set, the first electrodes of the transistor elements of the third pair being connected together and to the third electrode of the one transistor element of the second pair of the second set, the first electrodes of the transistor elements of the fourth pair being connected together and to the third electrode of the other transistor element of the second pair of the second set, the second electrodes of one of the transistor elements of each of the four pairs being connected together and to a third point of fixed potential, the second electrodes of the other transistor elements of each of the four pairs being individually connected to separate data input terminals, the third electrodes of the one transistor elements of the four pairs being connected together to an output terminal and through a resistance and a diode in parallel to a first source of reference potential, the third electrodes of the other transistor elements of the four pairs being connected directly to said first source of reference potential; and a resistance connected directly to the first electrodes of the pair of transistor elements of the first set and directly to a second source of reference potential.

2. A multiplexor in accordance with claim 1 including a biasing network connected between the first and second sources of reference potential;

the second electrode of one of the transistor elements of the pair of said first set being connected to a first point of fixed potential on said biasing network between said first and second sources of reference potential;

the second electrodes of the one of the transistor elements of each of the two pairs of said second set being connected to a second point of fixed potential on said biasing network between said first point of fixed potential and said first source of reference potential; and the second electrodes of the one of the transistor elements of each of the four pairs of said third set being connected to a third point of fixed potential on said biasing network between said second point of fixed potential and said first source of reference potential.

3. A multiplexor in accordance with claim 2 wherein each of said transistor elements is a bipolar transistor; and each of said first electrodes is an emitter, each of said second electrodes is a base, and each of said third electrodes is a collector.

4. A multiplexor comprising three sets of transistor elements, each transistor element having three electrodes;

the first of said sets including a pair of transistor elements having their first electrodes connected together, the second electrode of one of the transistor elements of the pair being connected to a first point of fixed potential, and the second electrode of the other of the transistor elements of the pair being connected to a first select input terminal;

the second of said sets including two pairs of transistor elements, the first electrodes of the transistor elements of the first pair being connected together and to the third electrode of the one transistor element of the first set, the first electrodes of the transistor elements of the second pair being connected together and to the third electrode of the other transistor element of the first set, the second electrode of one of the transistor elements of each of the two pairs being connected together and to a second point of fixed potential, and the second electrodes of the other of the transistor elements of each of the two pairs being connected together and to a second select input terminal;

the third of said sets including four pairs of transistor elements, the first electrodes of the transistor elements of the first pair being connected together and to the third electrode of the one transistor element of the first pair of the second set, the first electrodes of the transistor elements of the second pair being connected together and to the third electrode of the other transistor element of the first pair of the second set, the first electrodes of the transistor elements of the third pair being connected together and to the third electrode of the one transistor element of the second pair of the second set, the first electrodes of the transistor elements of the fourth pair being connected together and to the third electrode of the other transistor element of the second pair of the second set, the second electrodes of one of the transistor elements of each of the four pairs being connected together and to a third point of fixed potential, the second electrode of the other transistor elements of each of the four pairs being individually connected to separate data input terminals, the third electrodes of the one transistor elements of the four pairs being connected together to an output terminal and through a resistance to a first source of reference potential, the third electrodes of the other transistor elements of the four pairs being connected directly to said first source of reference potential;

a transistor device having a first electrode connected directly to a second source of reference potential, a second electrode connected to a fourth point of fixed potential, and a third electrode connected directly to the first electrodes of the pair of transistor elements of the first set;

a biasing network connected between the first and second sources of reference potential;

the second electrode of one of the transistor elements of the pair of said first set being connected to a first point of fixed potential on said biasing network between said first and second sources of reference potential;

the second electrodes of the one of the transistor elements of each of the two pairs of said second set being connected to a second point of fixed potential on said biasing network between said first point of fixed potential and said first source of reference potential;

the second electrodes of the one of the transistor elements of each of the four pairs of said third set being connected to a third point of fixed potential on said biasing network between said second point of fixed potential and said first source of reference potential;

the second electrode of said transistor device being connected to a fourth point of fixed potential on said biasing network between said first point of fixed potential and said second source of reference potential; and said biasing network including a semiconductor junction device connected between the fourth point of fixed potential and the second source of reference potential.

5. A multiplexor in accordance with claim 4 wherein each of said transistor elements and said transistor device is a bipolar transistor;

each of said first electrodes is an emitter, each of said second electrodes is a base, and each of said third electrodes is a collector.

6. A multiplexor in accordance with claim 5 wherein said transistor device has two emitters, both connected directly to the second source of reference potential.

7. A multiplexor in accordance with claim 7 including a diode connected between the output terminal and said first source of reference potential in parallel with said resistance.

8. A multiplexor comprising three sets of transistor elements, each transistor element having three electrodes;

the first of said sets including a pair of transistor elements having their first electrodes connected together, the second electrode of one of the transistor elements of the pair being connected to a first point of fixed potential, and the second electrode of the other of the transistor elements of the pair being connected to a first select input terminal;

the second of said sets including two pairs of transistor elements, the first electrodes of the transistor elements of the first pair being connected together and to the third electrode of the one transistor element of the first set, the first electrodes of the transistor elements of the second pair being connected together and to the third electrode of the other transistor element of the first set, the second electrode of one of the transistor elements of each of the two pairs being connected together and to a second point of fixed potential, and the second electrodes of the other of the transistor elements of each of the two pairs being connected together and to a second select input terminal;

the third of said sets including four pairs of transistor elements, the first electrodes of the transistor elements of the first pair being connected together and to the third electrode of the one transistor element of the first pair of the second set, the first electrodes of the transistor elements of the second pair being connected together and to the third electrode of the other transistor element of the first pair of the second set, the first electrodes of the transistor elements of the third pair being connected together and to the third electrode of the one transistor element of the second pair of the second set, the first electrodes of the transistor elements of the fourth pair being connected together and to the third electrode of the other transistor element of the second pair of the second set, the second electrodes of one of the transistor elements of each of the four pairs being connected together and to a third point of fixed potential, the second electrode of the other transistor elements of each of the four pairs being individually connected to separate data input terminals, the third electrodes of the one transistor elements of the four pairs being connected together to an output terminal and through a resistance to a first source of reference potential, the third electrodes of the other transistor elements of the four pairs being connected directly to said first source of reference potential; and a transistor device having two first electrodes, both connected directly to a second source of reference potential, a second electrode connected to a fourth point of fixed potential, and a third electrode connected directly to the first electrodes of the pair of transistor elements of the first set.

* * * * *